June 16, 1959      KAICHI IKEDA      2,890,636
DOUBLE-EXPOSURE PREVENTION DEVICE FOR REFLEX CAMERAS
Filed Aug. 21, 1953      2 Sheets-Sheet 1

June 16, 1959    KAICHI IKEDA    2,890,636
DOUBLE-EXPOSURE PREVENTION DEVICE FOR REFLEX CAMERAS
Filed Aug. 21, 1953    2 Sheets-Sheet 2

2,890,636
Patented June 16, 1959

2,890,636

DOUBLE-EXPOSURE PREVENTION DEVICE FOR REFLEX CAMERAS

Kaichi Ikeda, Nichinomiya, Japan, assignor to Chiyoda Kogaku Seiko Kabushiki Kaisha, Osaka, Japan, a corporation of Japan Application August 21, 1953, Serial No. 375,705

Claims priority, application Japan September 17, 1952

1 Claim. (Cl. 95—31)

The present invention relates to a device for the prevention of double exposure in a camera equipped with a lens-shutter.

It has long been desired to provide a camera with a device for preventing double exposure. So far, however, no practically usable one has been obtained. Many attempts have been made to prevent the double exposure by means of a special mechanism attached to the shutter. Such a device, however, could not be fully utilized by a camera user due to its intricate construction and a rather inconvenient manipulation thereof. Thus, no satisfactory photographing could be obtained thereby. In particular, in the binocular reflex camera, no satisfactory device for preventing the double exposure has ever been developed.

The object of the present invention is to provide a device for preventing double exposure, which is of a simple construction and easy to operate, in order to overcome the aforesaid disadvantages in prior devices of this kind. In the present invention, the end of a first lever (a release-stop-lever) is designed to be thinner to some extent than that of a second one (a lock-stop-lever); the rotation of a shutter-lever-ring causes the rotation of the first and second levers about their respective spindles, and a reciprocable piece is provided for acting constantly in such a direction as to stop their movement, whereby the rotation of the shutter-lever-ring is made impossible, excepting when the reciprocable piece is pulled back on purpose. Thereby, a satisfactory device for the prevention of double exposure has for the first time been obtained, which has a simple construction and is readily operable.

Other objects and advantages of this invention will be apparent from the following detailed description of an embodiment of this invention with reference to the accompanying drawings, of which:

Figure 1:
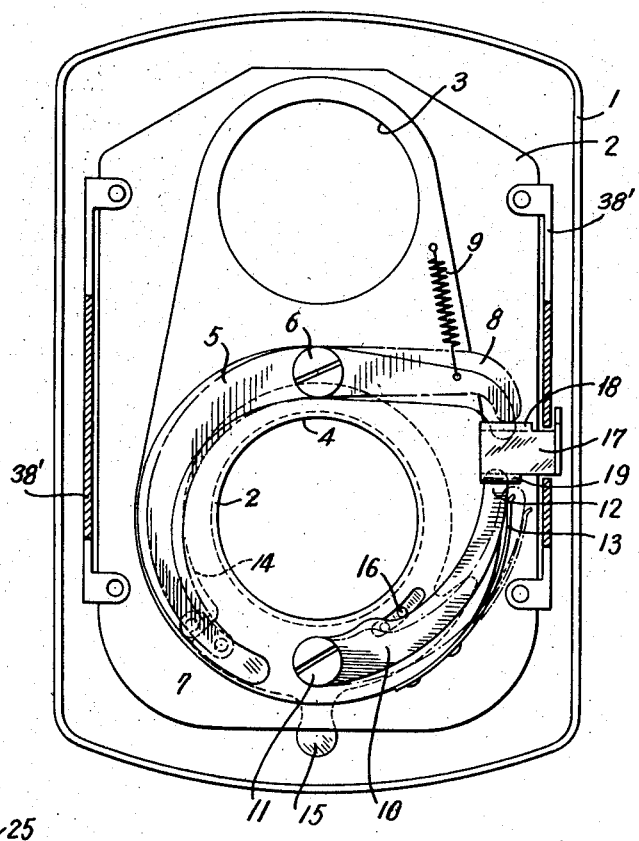
Fig. 1 is a front view representing one embodiment of this invention in section along the line I—I of Fig. 2.

In the drawings 1 is the front panel of a camera equipped with a frame 2 for receiving the lens cylinder, said lens cylinder-receiving frame having an opening 3 for sighting leases in its upper portion and one 4 for photographing lenses in the lower portion. The first lever 5 is pivoted to the lens-receiving frame 2 by means of a spindle 6. One end of the lever 5 is provided with a pin 7, and the front end 8 thereof is held by means of a spring 9 elastically upwards. The second lever 10, which is thicker than the first lever 5, is pivoted to the frame 2 by means of a spindle 11. The front end 12 of this lever is held elastically upwards by means of a plate spring 13. A shutter-lever-ring 14, operable to fix a shutter-lever 15 and a pin 16, is adapted to turn, while avoiding spindles 6 and 11. The reciprocable member 17, arranged so as to project from one side portion of the lens cylinder-receiving frame 2, is positioned on the upper surface of the upper tongue piece 18 in the neighborhood of the front end of the first lever 5, while it is brought to come in contact with the front end 12 of the second lever on the lower tongue piece 19.

Figure 3:
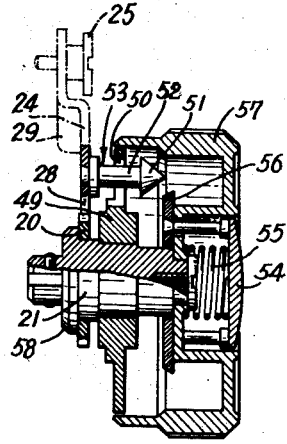
Fig. 3 is a sectional view taken along the line III—III of Fig. 2 showing a reel mechanism for films.
Figure 2:
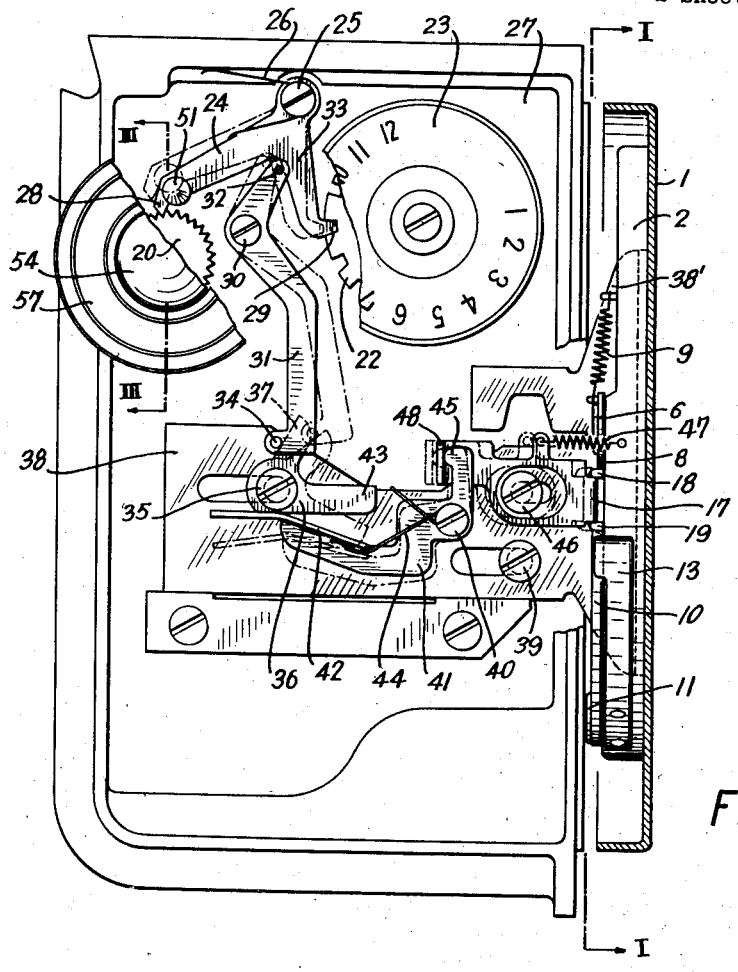
Fig. 2 is a side view with one part thereof being taken off.

Further, the interior construction of this device will be explained with reference to Fig. 2. In the upper portion of the camera interior, a disc 23 indicating the number of film sections reeled is arranged, comprising a film reeling spindle 21, Fig. 3 equipped with a gear wheel 20 on one hand and a check gear wheel 22 on the other. The check gear wheel 22 is provided with tooth-grooves in the circumference thereof, the number and dimension thereof being designed to coincide with a feed of one section of film, i.e. a revolution of said wheel 22 from one groove to the next groove is arranged to correspond to a feed of one section of film. A connecting lever 24 is pivoted by means of a spindle 25, and held by means of a spring 26 against the side panel 27, and possesses at the same time two claw pieces 28 and 29, the claw piece 28 being adapted to engage with the gear wheel 20, and the claw piece 29 to engage with the check gear wheel 22. The spring 26 biases the claw 29 to enter into each groove of wheel 22 in cooperation with the revolution thereof, said revolution of said wheel being carried out, for instance, by manually turning same. Thus, the claw 28 enters into a tooth groove of gear wheel 20 to stop the reeling action. An actuating lever 31 pivoted by means of a spindle 30 comes in contact with an inner portion 33 of the connecting lever 24 at one end of said actuating lever 31, the other end thereof having two leg portions through a pin 34 coming in contact with a leg portion 37 of a V-shaped lever 36 pivoted by means of a spindle 35. A sliding plate 38 for forwarding lenses is fixed with the lens cylinder-receiving frame 2 through a receiving plate 38' and adapted to slide along spindles 35 and 39. By providing any suitable mechanism (for instance a rack and pinion) in the lens sliding plate 38, the sliding plate 38 is allowed to slide so as to act as a focusing means. A driving bar 41 pivoted by means of a spindle 40 fixed on the sliding plate 38 comes in contact with a leg portion 43 of the V-shape lever through a receiving-plate portion 42 and is designed to be pressed constantly upwards by means of a spring 44, the other end 45 of the driving bar 41 coming in contact with a bent-back wall 48 of the reciprocable piece 17 which in turn is arranged slidably along a spindle 46 fixed on the sliding plate 38 and connected to the lens cylinder-receiving frame 2 by means of a spring 47. Further, in the film reeling mechanism, as illustrated in Fig. 3, the gear wheel 20 is fixed around the film-reeling-spindle 21, a ring piece 49 fixed to the camera body with a coil spring consists of a bearing for the reeling spindle 21 and a circular opening 50 is formed through the said ring. A driving bar 53 consisting of a conical front tip 51 and a spindle portion 52 is provided extending through said circular opening 50, the other end thereof being fixed to the claw leg 28 of the contacting lever 24. 54 is a button, 55 a spring and 56 a disc incorporated with the button 54. The disc 56 is adapted to move to the left on the plane of the drawing by the pressure of button 54 when it is pushed. 57 is a rotatable wheel connected to the film-reeling spindle 21, and 58 is a projection for fixing the film-reeling spindle.

Figure 4:
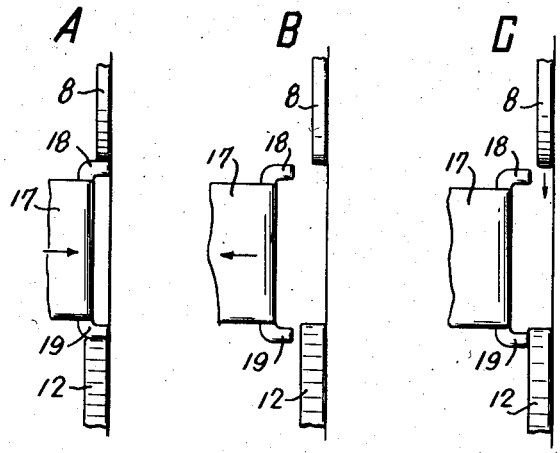
Fig. 4 is a diagrammatical side view illustrating the operation of the device.

The operation of the device according to the present invention is carried out as in the following manner. Namely, in the reeling of films, the button 54 is first pushed, the disc 56 is then moved to the left as viewed in Fig. 3, which causes the conical front tip 51 of driving bar 53 to be pushed by the periphery of the disc 56. Thereby the driving bar 53 is raised upwards, and as a result, the claw leg 28 is disengaged from the gear wheel 20. At the same time, the connecting lever 24 is shifted as indicated with the broken line in Fig. 2, while the claw leg 29 is then brought to disengage from the check gear wheel 22 and held in this position until after the pressure on the button 54 has been removed. The check gear wheel 22 is designed in a known manner to revolve to a small extent after the claw 29 has been released from a groove of the gear wheel 22, so that claw 29 will not enter into a groove of the check gear wheel 22, even if the button 54 is released. Thus, as the film becomes ready for reeling, it is reeled by turning the rotating wheel 57. When the gear wheel 22 has been revolved sufficiently to bring the next groove therein into register with the claw 29 this claw is then brought to engage in the next groove of wheel 22 under the bias of spring 26. Simultaneously claw 28 is caused to engage gear wheel 20 to stop the reeling action. In this manner, one film section is completely reeled, for as hereinbefore pointed out, an advance of wheel 22 from the groove to the next will correspond to a feed of one section of film. It returns again to the full line position. As in the manner just described, the film is reeled section by section exactly. However, the pushing on the button 54 has still another function. Namely, when the connecting lever 24 is moved to the broken line position by pushing on the said button 54 as above described, the claw leg 29 will shift the pin 32 of the actuating bar 31 to the left. Then, the actuating bar 31 turns around the spindle 30 as shown in the broken lines, and the V-shape lever 36 turns simultaneously about the spindle 35 as represented in the broken lines, and at the same time, the driving bar 41 turns also about the spindle 40. The front tip 45 comes then to push on the bent back wall portion 48 of the reciprocable piece 17 to make the latter 17 slide backward against the bias of the spring 47. Before the button 54 is pushed the front end 8 of the first lever and the front end 12 of the second lever are in the broken line position shown in Fig. 1, i.e. correspondingly in the relative positions of Fig. 4A in contact with the tongue pieces 18, 19 of the reciprocable piece 17, respectively. And, as soon as the reciprocable piece 17 is moved backward by the pushing of the button 54, said front end portions 8 and 12 will move to the positions as represented by Fig. 4B, because the obstacle to disturb their movement has thus been removed. In consequence, the first and second levers, 5, 10 will reach the full line positions as represented in Fig. 1. Now, the shutter with respect to the first lever 5 is in a position to be actuated, since the front end 8 of the first lever has become capable of moving further downward. As soon as the one section of film has been reeled as described before the engagement between the claw leg 29 and the check gear wheel will again restore the full line position of Fig. 2. Consequentially, all other parts will also return to their respective full line positions shown in Fig. 2. Though the reciprocable piece 17 tends also to restore its position, as shown in Fig 4A under the action of the spring 47, it will come to the relative position of Fig. 4C, being obstructed by the front end 12 of the second lever. The front end 12 of the second lever is thicker than the front end 8 of the first lever. Therefore, the movability of the front end portion 8 is not affected thereby as is shown in Fig. 4B. Thus the shutter remains in the workable condition. Aside from the operational manner just described, by moving the sliding plate 38 for forwarding lenses at any time with a suitable mechanism, the lens cylinder frame 2 is allowed to move backward or forward so that focusing may be enabled. Then, the preparation for photographing will be completed by bringing the shutter under tension.

The operation of the shutter is carried out in the following manner. Namely, all the operating parts are now in the position of Fig. 4C, i.e. in the full line position in Fig. 1. When the shutter lever 15 is turned clockwise (or in the direction of releasing) in Fig. 1, the shutter-lever-ring 14 rotates and thus the pin 7 is made to shift. Then, the first lever 5 acts further downwards against the spring 9 around the spindle 6 as a fulcrum, and becomes disposed in front of the tongue piece 18. The second lever 10 moves also toward the broken line position against the plate spring 13 and around the spindle 11 as a fulcrum. Now, the exposure will be effected through the action of shutter-lever-ring 14. On the other hand, the reciprocable piece 17, whose advancement has been checked with the front end 12 of the second lever 10, will now be allowed to advance under the action of spring 47, as soon as the second lever 10 moves towards the broken line position as shown in Fig. 1. And the return movement of the second lever 10 due to the aid of plate spring 13 will be prevented by the lower tongue piece 19. Then, the first lever 5 tends to return to the upper position by the action of spring 9 after the exposure has been completed. The first lever 5 is, directly upon finishing the exposure, allowed to return to the upper position, and further rise up to the position of Fig. 4A due to its bias. At the moment the position of Fig. 4A has been reached by said lever 5, the advancement of reciprocable piece 17 will be resumed and likewise the front end 8 of the first lever will finally come to the relative position of Fig. 4A, obstructed by the tongue piece 18. Since the reciprocable piece 17 prevents the movement of the front ends 8, 12 of the first and second levers by the tongue pieces 18, 19, the shutter-lever 15 will not work, because the front end 8 is halted by the upper tongue piece 18, even if one intends to turn the shutter-lever 15, the latter having been charged to the left carelessly. Thus, the double exposure can be perfectly prevented. And when a camera man makes a double exposure intentionally and once pushes on the button 54, all the aforementioned parts will act as in the same manner as described above, thus, the reciprocable piece 17 sliding backwards. The front end 12 of the second lever 10 will reach to the position of Fig. 4B under the action of the plate spring 13 and thereby the shutter will come to the movable state. Thus, a double exposure may be made at any desirable time.

As may be apparent from the foregoing description, according to the present invention, both the ordinary photographing exposure and the intentional double exposure are designed to be only possible when the button 54 is pushed down, the difference in both operations being made to depend on whether the film is reeled or not. Therefore, those operations are extremely simple, and those who are accustomed to use a camera of another type may readily utilize the device of this invention. Due to not only the above advantage, but also to other advantages, such as a simple construction, low fabrication cost and price, and ability to adapt other well-known constructions very easily by merely attaching thereto the device of this invention, the practical and industrial values of this invention are considerably high.

Further, it is quite obvious that the present invention is not limited to the particular embodiment as described above and illustrated in the accompanying drawings and that other embodiments not departing from the idea of the present invention may, of course, be included therein.

What I claim is:

A device for preventing double exposure in a camera equipped with a lens shutter, comprising in combination a rotatable shutter-lever-ring for operating the shutter, first and second levers adapted to be rotated about spindles respectively by the rotation of said rotatable shutter-lever-ring, a reciprocable piece constantly biased by means of a spring to a position preventing said lever actions, a connecting lever releasably engageable with a film-reeling mechanism and operably connected to said reciprocable piece through connecting linkage to move it against its bias to permit rotation of said shutter-lever-ring, the reeling of a section of film being enabled upon the disengagement of said connecting lever from said film-reeling mechanism, a button associated with said connecting lever and operable when pressed down to actuate said connecting lever and cause it to disengage from said film-reeling mechanism and move said reciprocable piece against its bias, said connecting lever being adapted to be reengaged with said film-reeling mechanism and permit the advance of said reciprocable piece under its bias after the reeling of the film section has been completed, said first and second levers having ends adjacent the said reciprocable piece with the end of the first lever being thinner than the end of the second lever and arranged whereby when said reciprocable piece is moved against its bias, the end of the second lever becomes disposed in position to prevent the advance of said reciprocable piece to its biased position while permitting movability of the end of the first lever and rotation of said shutter-lever-ring, said rotation of the shutter-lever-ring being then effective to operate the shutter and also move the end of the second lever out of the path of the reciprocable piece permitting it to return to its biased position once more, thus making possible only one exposure as a rule in the reeling of one film section, and, if desired, a double exposure merely by pressing said button down again.

References Cited in the file of this patent

UNITED STATES PATENTS

| | | |
|---|---|---|
| 2,028,752 | Burger | Jan. 28, 1936 |
| 2,541,289 | Richartz | Feb. 13, 1951 |
| 2,629,301 | Knauf | Feb. 24, 1953 |